(12) United States Patent
Ala-Laurila et al.

(10) Patent No.: US 6,477,156 B1
(45) Date of Patent: Nov. 5, 2002

(54) APPARATUS, AND ASSOCIATED METHOD, FOR SELECTABLY OPERATING RADIO DEVICE IN ALTERNATE OPERATING MODE

(75) Inventors: Juha Ala-Laurila, Tampere (FI); Harri Hansen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/342,367

(22) Filed: Jun. 29, 1999

(51) Int. Cl.[7] .................................................. H04Q 7/24
(52) U.S. Cl. ........................ 370/331; 370/338; 370/465; 455/436
(58) Field of Search ................................. 455/552, 436, 455/432, 434, 435, 450, 517; 370/329, 395.42, 395.5, 466, 486, 331–333, 522, 231, 235–236, 389, 396, 450, 506, 338, 401, 397, 524; 375/341, 262, 231, 233, 43.6, 232; 371/43.6

(56) References Cited

U.S. PATENT DOCUMENTS

| | | | |
|---|---|---|---|
| 5,077,732 A | 12/1991 | Fischer et al. ............. | 370/85.4 |
| 5,621,894 A | 4/1997 | Menezes et al. ........ | 395/200.12 |
| 5,706,428 A | 1/1998 | Boer et al. .................. | 395/200 |
| 5,912,885 A * | 6/1999 | Mitts et al. ................. | 370/331 |
| 5,960,344 A * | 9/1999 | Mahany ...................... | 455/432 |
| 5,963,599 A * | 10/1999 | Curtis et al. ................ | 375/341 |
| 6,243,778 B1 * | 6/2001 | Fung et al. ................. | 710/113 |

FOREIGN PATENT DOCUMENTS

| | | |
|---|---|---|
| EP | 0494576 | 7/1992 |
| EP | 0652668 | 5/1995 |
| EP | 0767548 | 4/1997 |
| WO | WO98/27747 | 6/1998 |

* cited by examiner

Primary Examiner—Ricky Ngo

(57) ABSTRACT

Apparatus, and an associated method, for identifying whether a mobile terminal and access point of a WLAN (wireless local area network) are capable of operation pursuant to a proprietary communication mode. If a determination is made that the communication pair is capable of operation pursuant to the proprietary communication mode, the mobile terminal is instructed to operate pursuant to the proprietary communication mode. Handover procedures are also provided by which better to assure that ongoing communications, during and subsequent to handover shall also be effectuated pursuant to the proprietary communication mode. Improved communication quality when the communication pair is operated pursuant to the proprietary communication mode relative to operation pursuant to a conventional IEEE 802.11 communication mode is possible.

19 Claims, 3 Drawing Sheets

APPARATUS, AND ASSOCIATED METHOD, FOR SELECTABLY OPERATING RADIO DEVICE IN ALTERNATE OPERATING MODE

The present invention relates generally to communications in a radio communication system, such as a WLAN (wireless local area network). More particularly, the present invention relates to apparatus, and an associated method, by which to identify whether proprietary WLAN radio functions are available to a mobile terminal-access point pair and to activate proprietary WLAN radio functions if such availability is identified. Performance of proprietary WLAN radio functions permits improved communication quality, such as improved handover performance, relative to conventional WLAN operation pursuant, e.g., to the IEEE 802.11 standard.

BACKGROUND OF THE INVENTION

A communication system is formed, at a minimum, of a transmitting station and a receiving station interconnected by a communication channel. Communication signals generated by the transmitting station are transmitted upon the communication channel to be received by the receiving station.

A radio communication system is a communication system in which at least a portion of the communication channel is formed of a portion of the electromagnetic spectrum. Increased mobility of communications is permitted as a fixed or hard-wired connection is not required to be formed between the transmitting and receiving stations.

A cellular communication system is an exemplary radio communication system. A subscriber to a cellular communication system, when positioned at almost any location throughout an area encompassed by the network infrastructure of the cellular communication system, is able to communicate by way of the system with a mobile terminal.

The network infrastructure of an exemplary cellular communication system includes spaced-apart, fixed-site base stations which include transceivers. In such an exemplary system, each fixed-site base station defines a cell. As the mobile terminal used by the subscriber to communicate with another communication station travels between cells of the system, uninterrupted communication is possible by handing-over communications from one base station to another.

Several analogous types of wireless communication systems have been implemented, and others have been proposed, to encompass limited areas, such as the area encompassed by a building structure or office workplace. Wireless communication systems sometimes referred to as microcellular networks, private networks, and WLANs (wireless local area networks) are exemplary of such systems.

Wireless communication systems are typically constructed pursuant to standards promulgated by a regulatory or quasi-regulatory body. For instance, the IEEE 802.11 standard promulgated by the IEEE (Institute of Electrical and Electronic Engineering) is a wireless LAN standard pertaining generally to the commercial 2.4 GHz wireless LAN (local area network). The 802.11 standard specifies an over-the-air interface between a wireless client, e.g, a mobile terminal, and a base station or access point, as well as among wireless clients. Standards pertaining to a physical layer and an MAC (media access control) layer are set forth in such standard. The standard permits automatic medium sharing between different devices which includes compatible physical layers. Asynchronous data transfer is provided for in the standard, generally by way of the MAC layer which utilizes a CSMA/CA (carrier sense multiple access with collision avoidance) communication scheme.

While the IEEE 802.11 standard provides for wireless communications through the use of mobile terminals constructed to be operable pursuant to such standard, the standard does not adequately provide for real time wireless services. For instance, in the current implementation of the standard, a significant loss of quality is sometimes experienced during handover of communications from one access point to another. Excessive numbers of data frames are susceptible to being lost or delayed, resulting in the loss of communication quality or even termination of communications.

Operational modes different than that set forth in the IEEE 802.11 standard are therefore required, particularly for real time wireless services. Proprietary functions have been proposed which permit improved quality of communications compared to operation pursuant to the existing IEEE 802.11 standard. Access points and mobile terminals operable to perform such proprietary functions are referred to as being proprietary mode capable.

However, both ends of the communication pair, i.e., the mobile terminal and the access point through which the mobile terminal communicates, must be capable of operation in the proprietary mode. If both ends of the communication pair are not together operable pursuant to the proprietary mode, conventional operation pursuant to the IEEE 802.11 standard is instead required.

Therefore, prior to permitting operation of both ends of the communication pair in the proprietary mode, a determination must be made of the ability of both ends of the communication pair together to be operable pursuant to the proprietary mode.

A manner by which to identify whether both ends of the communication pair are together operable in the proprietary mode, to activate both ends of the communication pair to operate in the proprietary mode, and to maintain proprietary mode operation during handover procedures from one access point to another is required.

It is in light of this background information related to wireless communications that the significant improvements of the present invention have evolved.

SUMMARY OF THE INVENTION

The present invention, accordingly, advantageously provides apparatus, and an associated method, to identify whether proprietary WLAN radio functions are available to a communication pair formed of a mobile terminal and access point.

The present invention further advantageously provides apparatus, and an associated method, to initiate activation of the proprietary WLAN radio functions subsequent to identifying that both the mobile terminal and access point of the communication pair are together operable pursuant to the proprietary WLAN radio function.

The present invention further advantageously provides apparatus, and an associated method, by which to maintain proprietary-mode of communication during handover of communications from one access point to another.

In one aspect of the present invention, a manner is provided to identify whether devices constructed to be operable in a WLAN, such as that defined in the IEEE 802.11 standard are also together operable pursuant to a proprietary mode of operation to perform proprietary WLAN radio functions. Such proprietary WLAN radio functions are intended to improve the quality of communications relative to the quality of communications provided for during operation pursuant to a conventional, IEEE 802.11 mode of operation.

In a further aspect of the present invention, responsive to identification that both ends of a communication pair formed of a mobile terminal and an access point of the WLAN are together operable pursuant to the proprietary mode, the mobile terminal is activated to be operable pursuant to the proprietary mode rather than the conventional, IEEE 802.11 mode of operation. Improved quality of communications relative to that permitted pursuant to conventional operation pursuant to the IEEE 802.11 standard is possible thereafter.

In a further aspect of the present invention, a manner is provided to assure better that ongoing communications effectuated by a communication pair operating pursuant to the proprietary mode of operation shall continue to be effectuated pursuant to the proprietary mode subsequent to handover of communications from one access point to another access point. In one implementation, the mobile terminal of the communication pair is provided with a list of access points which are capable of operation pursuant to the proprietary mode. The list, a neighboring-AP (access point) list, is used by the mobile terminal, or the network, in the determination of to which access point that handover of communications is permitted. As handovers thereby are only permitted between proprietary mode-capable access points if handover is effectuated only to an access point on the list, better assurances that the communications shall continue to be effectuated pursuant to the proprietary mode of operation are thereby provided. In one implementation, the list is provided to the mobile terminal at selected intervals. In another implementation, the list is provided to the mobile terminal when the mobile terminal is initially activated to be operable pursuant to the proprietary mode. Also, in another implementation, a network prefix or list of network prefixes is provided for the same purpose.

In one implementation, an EUI-64 type of MAC (media access control) layer address is provided to each device operable in the WLAN. The EUI-64 type address is formed of two fields, a company id field and a CDPD M-ES (cellular digital packet data-mobile end system number). Such address is globally unique. Prior to effectuation of communications, the EUI-64 MAC addresses of a communication pair formed of a mobile terminal and access point are compared to identify whether both of the devices are proprietary mode capable. If both devices are determined to be proprietary-mode capable responsive to the comparison, communications are permitted to be effectuated pursuant to the proprietary mode. The mobile terminal is thereafter activated to be operable pursuant to the proprietary mode, and improved communication quality of subsequent communications is possible. Also, when handover of communications is to be effectuated, handover is effectuated, if possible, only to a subsequent access point which also is proprietary mode capable. Continued communications of improved quality levels relative to conventional communications pursuant to the IEEE 802.11 standard are thereby possible.

In these and other aspects, therefore, apparatus, and an associated method, is provided for a radio communication system having a mobile terminal and at least one access point at which to permit communication access of the mobile terminal with network infrastructure. The mobile terminal and the access point together are operable pursuant to a first mode and potentially together operable pursuant to a second mode. The mobile terminal and the at least one access point are each identified by unique identifiers. Identification is made whether the mobile terminal and the access point are together operable pursuant to the second mode. A comparator is coupled to receive indications of the identifier which identifies the mobile terminal. The comparator is also coupled to receive indications of the identifier which identifies the access point. The comparator compares values of the identifiers. The comparator indicates the mobile terminal and the access points together to be operable pursuant to the second mode if the values of the identifiers indicate both the mobile terminal and the access point to be capable of operation pursuant to the second mode. And, the comparator indicates the mobile terminal and the access point together to be operable only pursuant to the first mode if the values of the identifiers fail to indicate both the mobile terminal and the access point operable pursuant to the second mode.

A more complete appreciation of the present invention and the scope thereof can be obtained from the accompanying drawings which are briefly summarized below. The following detailed description of the presently-preferred embodiments of the invention, and the appended claims.

DETAILED DESCRIPTION OF THE PREFERRED EMBODIMENT

Figure 1:
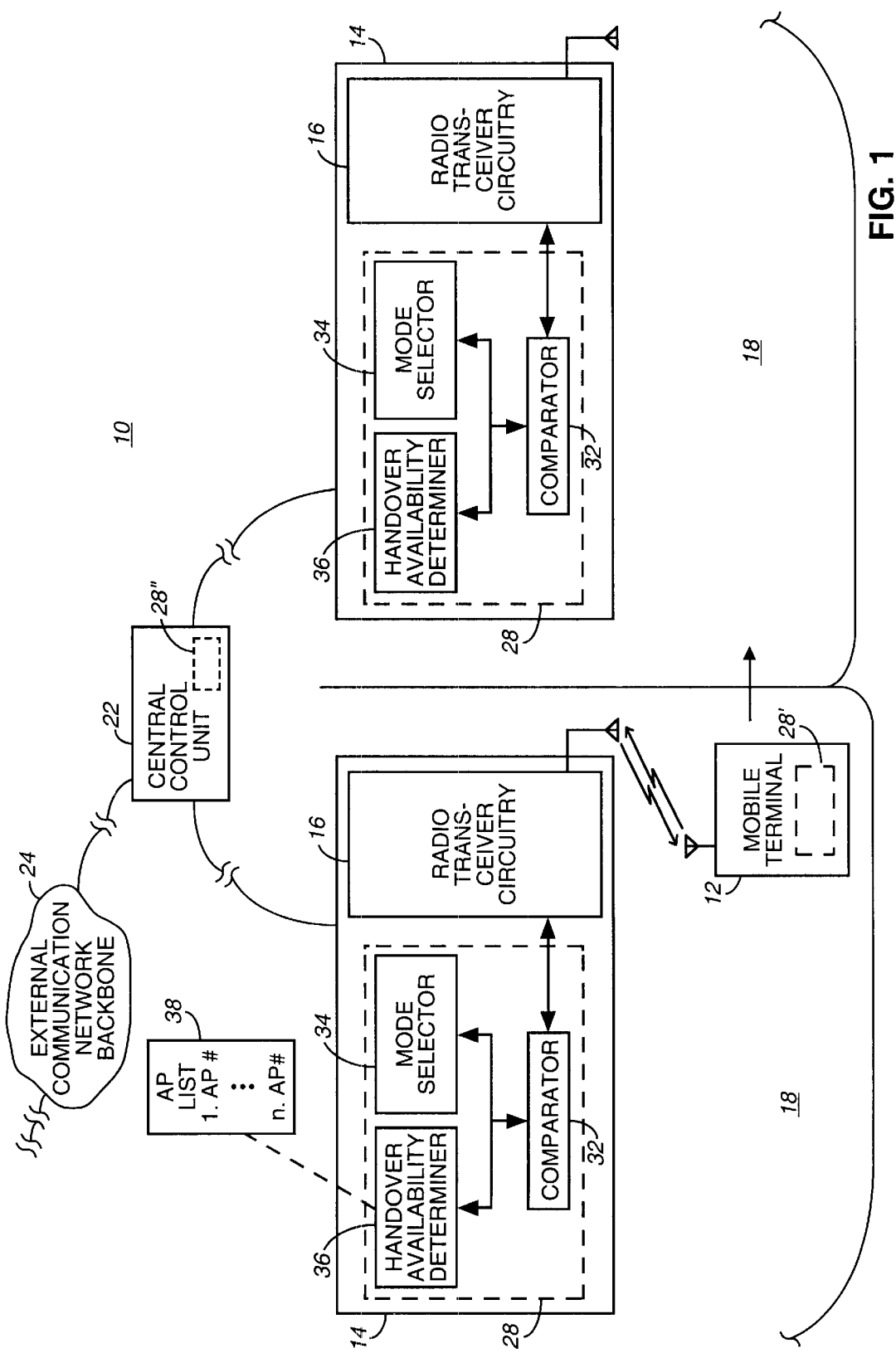
FIG. 1 illustrates a functional block diagram of a communication system in which an embodiment of the present invention is operable.

Referring first to FIG. 1, a communication system, shown generally at 10, provides for radio communications with mobile terminals, of which the mobile terminal 12 is exemplary, therein. In the exemplary implementation, the communication system 10 forms a WLAN (wireless local area network) which provides for radio communications with the mobile terminal as set forth in the IEEE 802.11 standard as well, potentially, pursuant to a proprietary mode of operation. Other communication systems can analogously be represented, and operation of an embodiment of the present invention is analogously also operable in such other communication systems.

In conventional manner, the WLAN includes a plurality of spaced-apart access points (APs) 14 positioned at spaced-apart locations. Two access points are shown in the Figure. In an actual WLAN, typically, in greater numbers of access points 14 are utilized. The access points 14 are sometimes referred to as base stations or RADs (remote antenna devices). The term "access point" shall generally be used herein to identify such devices as the devices form the points of access to the network infrastructure of the communication system.

The access points 14 include radio transceiver circuitry 16 capable of transceiving radio communication signals with mobile terminals when the mobile terminals are positioned within communication range of the access points. Generally, a mobile terminal communicates with an access point 14 when the mobile terminal is positioned within an area, referred to as a cell 18, proximate to, and defined by, the access point. The Figure illustrates a cell 18 associated with each of the illustrated access points.

The access points 14 are here shown to be coupled to a central control unit (CCU) 22. The CCU 22 provides control functions to control various aspects of operation of the WLAN. And, as shown, the CCU 22 provides for connections to an external communication network backbone 24. Although not separately shown, other communication devices, such as other communication stations and other communication networks are typically coupled to the communication network backbone 24. Thereby, a communication path can be formed to provide for communications between the mobile terminal 12 and communication stations coupled, either directly or indirectly, to the communication network backbone. Also, local communications between mobile terminals 12 are also permitted. In communications between pairs of mobile terminals, the communication path formed therebetween includes two separate radio-links.

In the exemplary implementation, the access points 14 include control elements 28. The control elements 28 perform various control functions related to operation of the respective access points. Here, the control elements are each shown to include a comparator 32, a mode selector 34, and a handover availability determiner 36. Such elements are functional and are implemented in a desired manner, such as, for instance, algorithms executable by processing circuitry of which the control element is formed in the exemplary implementation. In another implementation, the functions performed by such elements are located elsewhere, such as at the mobile terminal, indicated by the block 28' or at the CCU 22, indicated by the block 28", also shown in dash. And, the functions performed by the elements can also be distributed amongst several different devices.

As noted above, because of various deficiencies of the IEEE 802.11 standard, communication quality of communications between the mobile terminal and an access point during the effectuation of, e.g., real time wireless services, the proprietary mode of operation, if available, is preferred to operation pursuant to the conventional IEEE 802.11 standard. However, effectuation of communication between a mobile terminal and an access point pursuant to the proprietary mode of operation requires that both the access point and the mobile terminal be operable pursuant to such proprietary mode. Operation of an embodiment of the present invention identifies whether both of the elements of the communication pair, i.e., the access point and the mobile terminal are together operable pursuant to the proprietary mode. When both elements of the communication pair are identified as being proprietary mode capable, effectuation of communication pursuant to the proprietary mode is permitted.

The comparator 32 is here operable to receive indications of identifiers which identify both the mobile terminal and the access point forming the communication pair. Responsive to the comparisons performed by the comparator, the communication pair is identified either to be proprietary mode capable or merely conventional, IEEE 802.11 mode capable.

Responsive to the identification made by the comparator, the mode selector 34 is operable to select the mode of operation by which to effectuate communications between the mobile terminal and the access point. If the communication pair is determined to be proprietary mode capable, then communications generally are preferred to be effectuated pursuant to the proprietary mode. In the exemplary implementation, once selection is made by the mode selector, a command signal is broadcast to the mobile terminal to instruct the mobile terminal to become activated in the proprietary mode. And, the mobile terminal returns an acknowledgment once the mobile terminal has become activated into the proprietary mode.

As the position at which the mobile terminal changes, the mobile terminal might leave one cell and enter another cell, handover of communications from the access point associated with the first cell to the access point associated with the subsequently-entered cell is generally to be effectuated to permit continued communication with the mobile terminal. The handover availability determiner is operable pursuant to an embodiment of the present invention to provide indications to the mobile terminal of available access points to which handovers of communications are possible. In the exemplary implementation, when the mobile terminal and access point communication pair are operable pursuant to the proprietary mode of operation, the determiner 36 generates an available access point list 38 which contains the identities of access points which are proprietary mode capable and available for handover of communications thereto. When the available access points to which handover is permitted are formed only of proprietary mode capable access points, handover of communication to an access point which is proprietary mode compliant is thereby assured. The access point list 38, in one implementation, is communicated to the mobile terminal at selected intervals. In another implementation, the access point list is provided to the mobile terminal when the mobile terminal is initially activated into the proprietary mode. And, in another implementation, a network prefix, or list of network prefixes is used to effectuate the same goal.

Figure 2:
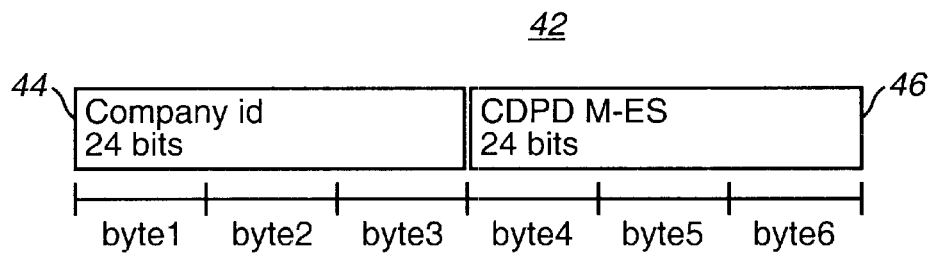
FIG. 2 illustrates a representation of an MAC (media access control) layer address used to identify devices operable in the communication system shown in FIG. 1 according to an embodiment of the present invention.

Turning next to FIG. 2, an MAC (media access control) layer address 42 utilized during operation of an embodiment of the present invention is shown. The MAC layer address is of an EUI-64 type. The address is formed of two fields, a company id field 44, and a CDPD M-ES (cellular digital packet data-mobile endsystem number) field 46. Each of the fields 44 and 46 is of a length of twenty-four bits. The fields are defined in an existing cellular digital packet data systems specification.

The twenty-four most significant bits forming the company id field 44 are assigned by an IEEE registration authority (IEEE RAC) to a specific manufacturer. Thereby, the company id 44 uniquely identifies the manufacturer of a device. And, a CDPD M-ES field is a number assigned by the manufacturer to a particular device to identify the device. Because of the length of the field 46, approximately sixteen million unique values of the address 42 are possible by varying the final twenty-four bits of the address, i.e., the contents of the field 46. Conventionally, an additional company id is provided to a manufacturer when about ninety percent of the address values of the sixteen million available addresses with a single company id have been used. As a result, each address 42, formed of the company id and CDPD M-ES fields 44 and 46, is globally unique.

Values of the addresses identifying the access point and the mobile terminal forming a communication pair are provided to the comparator 28 and the comparator is operable responsive thereto to identify whether the mobile terminal and access point forming the communication pair are together proprietary mode compliant. When the comparator is positioned at the access point, the access point is already known to be, or to not be, proprietary mode capable. Separate analysis of the address of the company id can be obviated in such an embodiment.

Only portions of the address may need to be compared. For instance, if all of the products manufactured by a manufacturer are proprietary mode capable, the mode can be identified according only to analysis of the company id fields of the addresses. If, however, only some devices manufactured by a manufacturer are proprietary mode capable, the fields 46 must be analyzed to determine whether the particular device is proprietary mode capable.

In one implementation, the mobile terminal enters the proprietary mode of operation upon selection by the mode selector of the access point and communication to the mobile terminal of the selection by way of an MAC layer message. During mobile registration, the access point inspects the MAC layer address of the mobile terminal, along with the layer address of the access point, to determine whether the communication pair supports operation in the proprietary mode. Subsequent to the determination, the access point commands the mobile terminal to enter the proprietary mode by way of a proprietary MAC-message or a proprietary coding in a standard message. In alternate implementations, the messaging is implemented at the network level and the signaling is appropriately altered. Also, in an implementation in which comparisons are made at the mobile terminal, the signal link is again appropriately altered.

Figure 3:
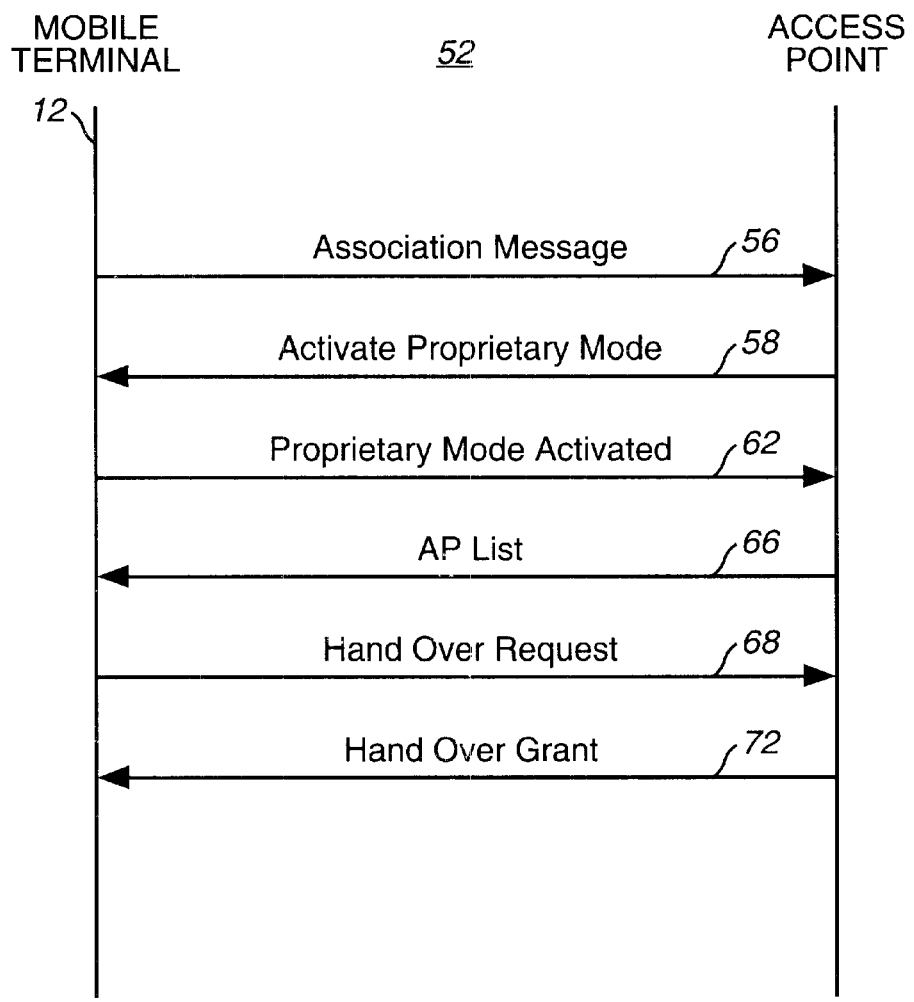
FIG. 3 illustrates a sequence diagram illustrating the signal sequencing between a mobile terminal and an access point during operation of an embodiment of the present invention.

FIG. 3 illustrates a sequence diagram, shown generally at 52, representative of signaling between a mobile terminal 12 and access point 14 which together form a communication pair. First, and as indicated by the segment 56, the mobile terminal sends a standard IEEE 802.11 association message to the access point. The association message includes the MAC layer address 42, unique to the mobile terminal. The access point is operable, as noted above, to analyze the value of the MAC layer address of the mobile terminal to identify whether the access point and the mobile terminal together are operable pursuant to the proprietary mode. In one implementation, because the comparisons are made at the access point, the ability of the access point to operate pursuant to the proprietary mode is pre-ordained, i.e., already known.

Here, the mobile terminal and the access point are together operable pursuant to the proprietary mode and the access point generates a command, indicated by the segment 58, to order the mobile terminal to activate itself to be operable pursuant to the proprietary mode. And, as indicated by the segment 62, the mobile terminal confirms the activation and indicates the exact nature of the proprietary mode, e.g., mode B, Phase 4.

The sequence diagram further illustrates transmission, indicated by the segment 66, of the AP list 38 to the mobile terminal. When the mobile terminal exits one cell and enters another cell, a handover request is generated, indicated by the segment 68, and, if appropriate, the handover request is granted, indicated by the segment 72.

Figure 4:
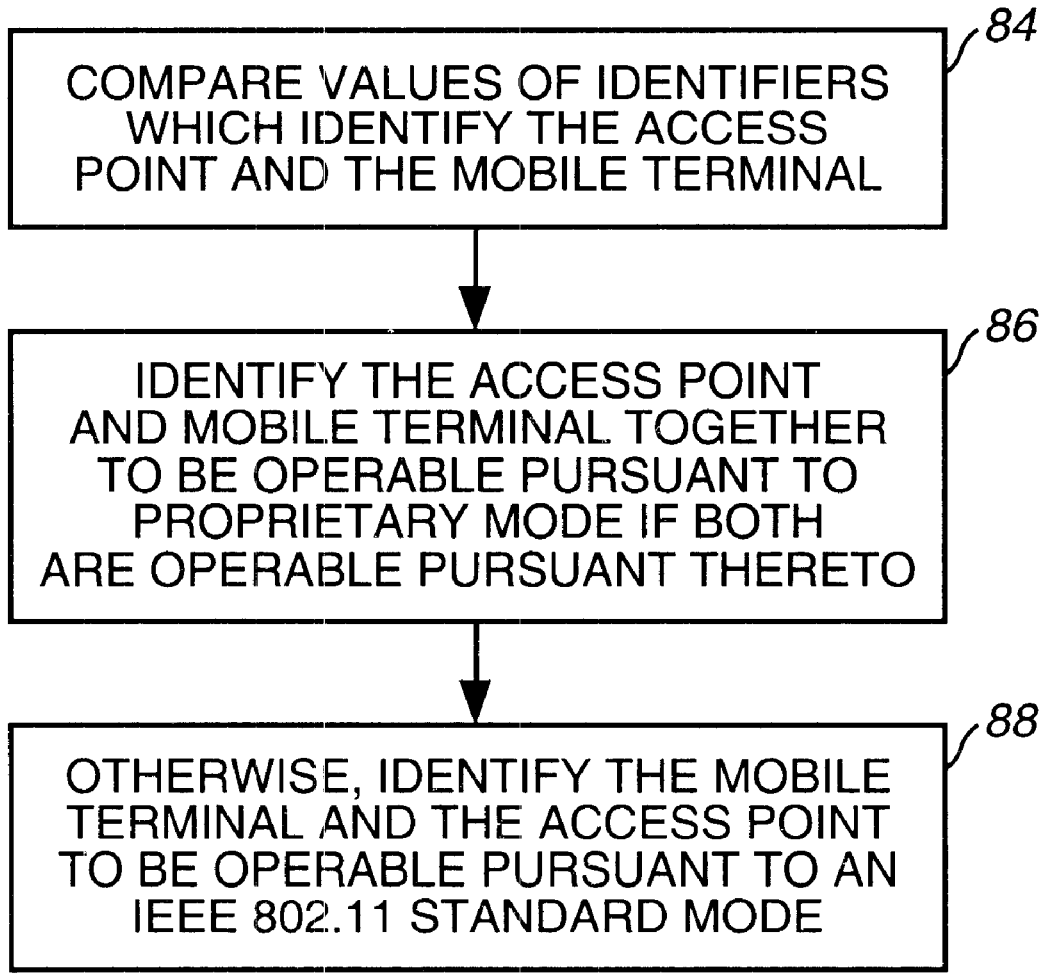
FIG. 4 illustrates a method flow diagram listing a method of operation of an embodiment of the present invention.

FIG. 4 illustrates a method, shown generally at 82, listing the method steps of the method of operation of an embodiment of the present invention. The method identifies whether a mobile terminal and an access point, together forming a communication pair, are together operable pursuant to a proprietary mode.

First, and as indicated by the block 84, the values of the identifier which identifies the access point and the identifier which identifies the mobile terminal are compared.

Responsive thereto, and as indicated by the block 86, the mobile terminal and the access point are together identified to be operable pursuant to the proprietary mode if the identifiers indicate the mobile terminal and the access point together are operable pursuant to the proprietary mode. Otherwise, and as indicated by the block 88, the mobile terminal and the access point are identified together to be operable pursuant to a conventional, IEEE 802.11 mode.

Thereby, through operation of an embodiment of the present invention, a manner is provided to identify whether a communication pair formed of a mobile terminal and access point are proprietary mode capable, a manner is provided by which to activate the mobile terminal to be operable pursuant to the proprietary mode is provided, and a manner is provided by which to assure better that the mobile terminal shall continue to communicate pursuant to the proprietary mode during, and subsequent to, handover of communications.

The previous descriptions are of preferred examples for implementing the invention, and the scope of the invention should not necessarily be limited by this description. The scope of the present invention is defined by the following claims.

We claim:

1. In a radio communication system having a mobile terminal and at least one access point at which to permit communication access of the mobile terminal with network infrastructure, the mobile terminal and the access point together operable pursuant to a first communication mode and potentially together operable pursuant to a second communication mode, and the mobile terminal and the at least one access point each identified by identifiers that contain information relating to communication-mode capability, an improvement of apparatus for identifying whether the mobile terminal and the access point are together operable pursuant to the second communication mode, said apparatus comprising:

a comparator coupled to receive indications of the identifier that identifies the mobile terminal and to receive indications of the identifier which identifies the access point, said comparator for comparing values of the identifiers, the comparator indicating the mobile terminal and the access point together to be operable pursuant to the second communication mode if the values of the identifiers indicate both the mobile terminal and the access point to be capable of operation pursuant to the second communication mode, and the comparator indicating the mobile terminal and the access point together to be operable only pursuant to the first communication mode if the values of the identifiers fail to indicate both the mobile terminal and the access point to be operable pursuant to the second mode.

2. The apparatus of claim 1 further comprising an operational communication mode selector coupled to said comparator to receive results of comparisons made thereat, said selector for selecting pursuant to which of the first communication mode and the second communication mode the mobile terminal and the access point together are to be operated, the mobile terminal and the access point together operated responsive to selection made by said selector.

3. The apparatus of claim 2 wherein the at least one access point comprises a first access point and at least a second access point, the mobile terminal capable of communicating with the network infrastructure first by way of the first access point and thereafter with the at least second access points subsequent to handover thereto, the first and the at least second access points operable pursuant to a common communication mode.

4. The apparatus of claim 3 further comprising a handover access point availability indicator for generating a neighboring access point list that lists access points available for handover.

5. The apparatus of claim 4 wherein the neighboring access point list includes information relating to the communication-mode capability of listed access points available for handover.

6. The apparatus of claim 5 wherein the neighboring access point list generated by said handover access point availability indicator is provided to the mobile terminal responsive to activation thereof to be operable pursuant to the second communication mode together with the first access point.

7. The apparatus of claim 5 wherein the neighboring access point list comprises a list of network prefixes.

8. The apparatus of claim 1 wherein the radio communication system comprises a WLAN (wireless local area network), wherein the first communication mode comprises a standard IEEE 802.11 ("802.11") communication mode and the second communication mode comprises non802.11 communication mode, wherein the identifiers that identify each of the mobile terminal and the at least one access point comprise EUI-64 MAC addresses and wherein said comparator is coupled to receive indications of the EUI-64 MAC address identifying the mobile terminal and indications of the EUI-64 MAC address identifying the access point.

9. The apparatus of claim 8 wherein values of the EUI-64 MAC addresses indicate whether the mobile terminal and at least one access point identified by respective ones of the EUI-64 MAC addresses are operable pursuant to the other-than standard IEEE 802.11 mode.

10. The apparatus of claim 9 wherein the EUI64 MAC addresses each include a company id field and an equipment id field and wherein values of a selected one of the company id field and the equipment id field identify whether the mobile terminal and the at least one access point are operable pursuant to the non-802.11 mode.

11. The apparatus of claim 1 wherein said comparator forms a portion of the access point.

12. The apparatus of claim 1 wherein said comparator forms a portion of the network infrastructure.

13. The apparatus of claim 1 wherein said comparator forms a portion of the mobile terminal.

14. In a method for communicating data in a radio communication system having a mobile terminal and at least one access point at which to permit communication access of the mobile terminal with network infrastructure, the mobile terminal and the access point together operable pursuant to a first communication mode and potentially together operable pursuant to a second communication mode, and the mobile terminal and the at least one access point each identified by identifiers, an improvement of a method for identifying whether the mobile terminal and the access point are together operable pursuant to the second mode, said method comprising the operations of:

comparing values of the identifier which identifies the access point and the identifier which identifies the mobile terminal;

identifying the mobile terminal and the access point together to be operable pursuant to the second communication mode if the identifiers compared during said operation of comparing indicate the mobile terminal and the access point together are operable pursuant to the second communication mode and otherwise;

identifying the mobile terminal and the access point together to be operable pursuant to the first communication mode.

15. The method of claim 14 comprising the additional operation, prior to said comparing operation, of sending values indicative of the identifier identifying the mobile terminal to the access point.

16. The method of claim 14 comprising the additional operation of selecting operation of the mobile terminal in the second communication mode if the mobile terminal and the access point are identified together to be operable pursuant to the second mode.

17. The method of claim 16 wherein said selecting operation comprises sending an activation command to the mobile terminal to activate the mobile terminal to be operable pursuant to the second communication mode of the operation.

18. The method of claim 16 comprising the additional operation of handing over communications to an other of the at least one access point, the other access point also operable pursuant to the second communication mode of operation.

19. The method of claim 18 comprising the additional operation, prior to said operation of handing over communications, of providing a neighbor access point list to the mobile terminal.

* * * * *